United States Patent [19]
Monroe

[11] 3,713,688
[45] Jan. 30, 1973

[54] MULTIPLE POSITION OVERHEAD GUARD

[75] Inventor: James G. Monroe, Portland, Oreg.
[73] Assignee: Hyster Company, Portland, Oreg.
[22] Filed: Oct. 27, 1970
[21] Appl. No.: 84,395

[52] U.S. Cl. .............................. 296/107, 280/150 C
[51] Int. Cl. ............................................. B62d 25/06
[58] Field of Search ........................... 280/150 C; 296/102, 107, 137 B

[56] References Cited

UNITED STATES PATENTS 3,336,074  8/1967  Barnes .............................. 280/150 C
3,472,550  10/1969  Marco .................................. 296/102

FOREIGN PATENTS OR APPLICATIONS 117,765  8/1918  Great Britain ...................... 296/102

Primary Examiner—Leo Friaglia
Assistant Examiner—Robert R. Song
Attorney—Francis Swanson

[57] ABSTRACT

A multiple position overhead guard for an industrial truck is disclosed. The present embodiment shows an upright position and a lowered position. In its lowered position, the overhead guard permits the industrial truck to negotiate entrances having restricted overhead clearance. In both positions the guard may be secured rigidly to the truck chassis.

1 Claim, 2 Drawing Figures

PATENTED JAN 30 1973   3,713,688

INVENTOR
JAMES G. MONROE
BY
Jacob Wilhauf
Attorney

MULTIPLE POSITION OVERHEAD GUARD

BACKGROUND OF THE INVENTION

The present invention relates to overhead guards for mobile machinery and more particularly to industrial trucks having overhead guards capable of being lowered to provide additional clearance when entering areas which are obstructed from above.

DESCRIPTION OF THE PRIOR ART

The conventional overhead guard of an industrial truck is a rigid structure which cannot be adjusted to provide varying clearance. To answer the need for an adjustable overhead guard manufacturers have developed constructions in which the guard is not fastened to the truck at its forward end and is pivoted at its rear to allow the guard to swing through an arc to a position behind the truck counterweight. This approach increases the turning radius by increasing the effective length of the truck and poses the threat of damage to the overhead guard when the truck is backing up with the guard retracted. Another approach has been to construct the guard of many small pieces so that it may be collapsed accordian-like into the space between the driver's seat and the rear extremity of the counterweight. This approach is expensive and requires complex folding geometry. Such guards contain an inherent weakness because of the many joints in such constructions.

SUMMARY OF THE INVENTION

In the present invention the above described limitations are overcome. One object of this invention is to provide on an industrial truck a strong, substantially rigid overhead guard capable of being lowered to a position no higher than the fully lowered height of the industrial truck's mast.

A further object is to provide an overhead guard which folds to a position within the rear-most limits of the industrial truck.

A further object of this invention is to provide an overhead guard which can be locked securely in place in either the fully raised or the fully lowered position.

DESCRIPTION OF THE DRAWINGS

The foregoing and other features, objects and advantages of the present invention will be more apparent from the following detailed description which proceeds with reference to the accompanying drawings wherein.

DETAILED DESCRIPTION

Figure 1:
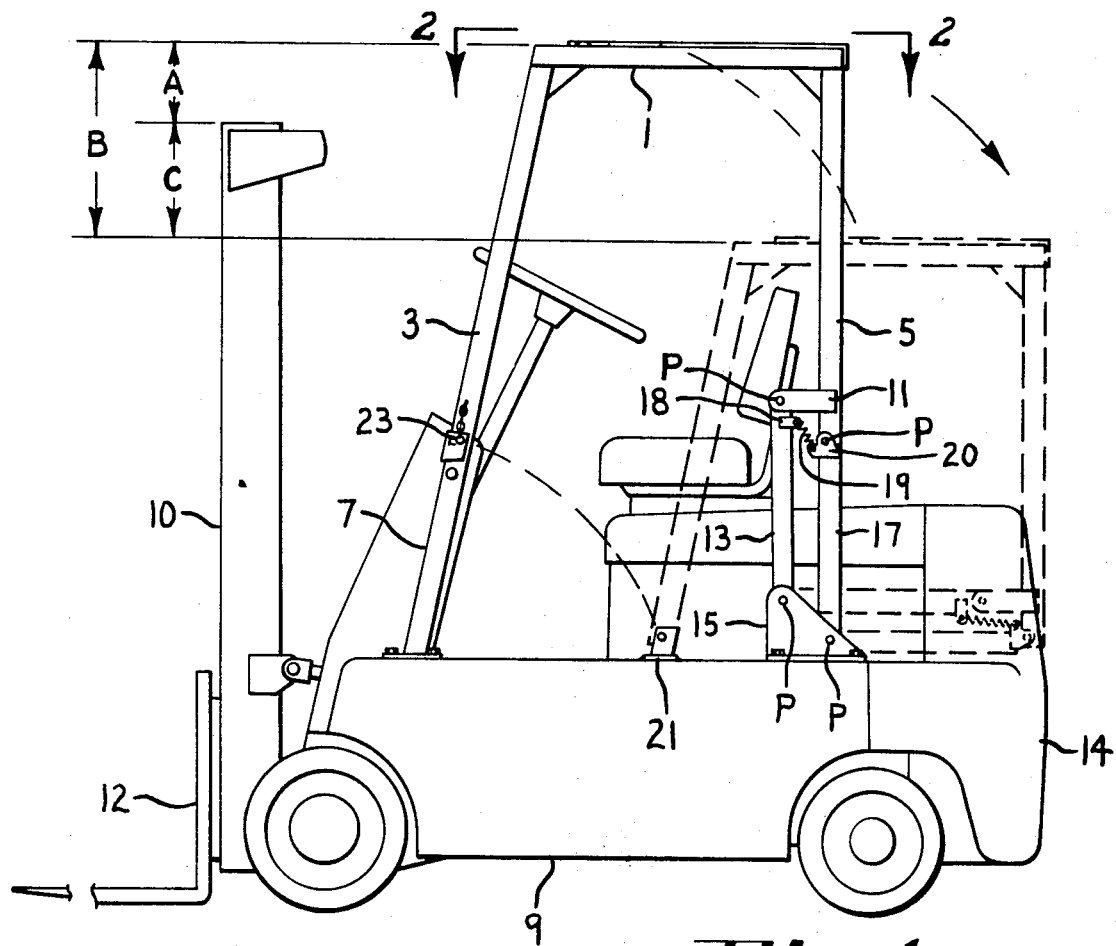
FIG. 1 is a side elevational view of an industrial truck showing the overhead guard mounted thereon, the guard being in its upper-most position. The fully lowered position of the overhead guard is shown in phantom on the drawing.
Figure 2:
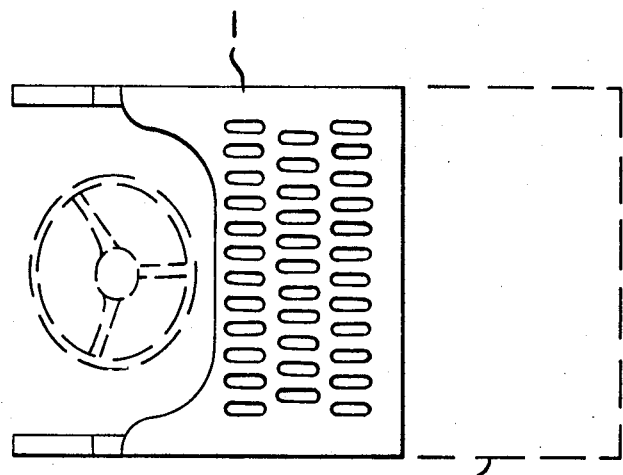
FIG. 2 is a sectional view taken along line 2—2 of FIG. 1.

The overhead guard consists of a protective platform 1, a pair of downwardly depending legs 3 attached to the front of platform 1, and a second pair of downwardly depending legs 5 at the rear of platform 1. A pair of struts 7 are anchored to the truck chassis 9 and provide mounting for the forward legs 3 which are attached to platform 1. Also mounted on the truck's chassis at its forward end is a lifting mast 10 to which are attached lifting forks 12. A counterweight 14 is mounted on the rear of the truck chassis 9. Each of the downwardly depending legs 5 at the rear of platform 1 is operatively connected to a separate and identical four-bar linkage mechanism. This linkage mechanism consists of a first bar 11 rigidly connected to leg 5 in a direction normal to the longitudinal axis of the leg. A link 13 is pivotally connected both to bar 11 and to a pivot bracket 15 mounted on the truck's chassis 9. A second link 17 is pivotally connected to both legs 5 and pivot bracket 15. These two links 13 and 17 are parallel, and together with bar 11 and pivot bracket 15 form a four-bar parallelogram linkage mechanism. The counterbalance spring 19 connects links 13 and 17 by means of a first ear 18 on link 13 and a second ear 20 on link 17. A bracket 21 mounts on chassis 9 to receive legs 3 and provides a means of fastening legs 3 securely in place when the overhead guard is moved to its rear-most and lowered position. A pair of removable locking pins 23 are used to lock the guard in either its upper-most or lower-most position by inserting the pins through holes in legs 3 and in matching holes in struts 7 or bracket 21 respectively.

OPERATION

To illustrate the operation of the overhead guard, assume that the guard is in its upper position with legs 3 fastened by pins 23 to struts 7. In this position the guard is at a distance A above the height of the fully lowered mast 10. The operator first removes pins 23 and then simply pulls backwards on legs 3 causing the links 13 and 17 to pivot about the four transverse axes represented by the pivotal points P on bracket 15, arm 11 and legs 5. As the overhead guard moves backward, platform 1 always remains substantially horizontal and parallel to a longitudinal horizontal plane of chassis 9 of the truck. When the overhead guard is moved to its fully lowered position no portion of its rear-most extremity, legs 5, extends beyond the rear-most portion of counterweight 14. After the platform 1 has been fully lowered the operator secures legs 3 to brackets 21 with pins 23. The guard is now fully lowered, secured and ready for use in areas where overhead clearance is restricted. As shown in FIG. 1 the guard has been lowered a total distance B relative to its fully raised position, and platform 1 is at a distance C below the top of mast 10 when the mast is in its fully lowered position. When the operator wishes to reposition the guard to its normal, fully raised height, he merely reverses the above procedure.

Having illustrated and described the preferred embodiment of my invention, other modifications in arrangement and detail will occur to those skilled in the art. I claim as my invention all such inventions as come within the true spirit and scope of the following claims.

I claim:

1. In an industrial truck having a chassis, an extensible mast at its forward end, a counterweight at its rearward end, an overhead guard on said truck comprising:
   strut means mounted on said chassis;
   a horizontal protective platform including a plurality of downwardly depending legs, said platform being detachably connected to said strut means; and link means for lowering said horizontal platform, said link means including a first pivot bracket mounted on said chassis rearwardly of said strut means;

a first pivotable link connecting said horizontal platform to said first pivot bracket;

a second pivot bracket connected to one of said downwardly depending legs; and a second pivotable link interposed between said first and second pivot bracket parallel to said first link.

* * * * *